US010732336B2

(12) United States Patent
Dewa et al.

(10) Patent No.: US 10,732,336 B2
(45) Date of Patent: Aug. 4, 2020

(54) METHOD OF ASSEMBLING OPTICAL SYSTEMS AND MINIMIZING RETARDANCE DISTORTIONS IN OPTICAL ASSEMBLIES

(71) Applicant: Corning Incorporated, Corning, NY (US)

(72) Inventors: Paul Gerard Dewa, Newark, NY (US); Robert Dennis Grejda, Fairport, NY (US); Stephen Karl Mack, Rush, NY (US); Robert Louis Michaels, Rochester, NY (US); Paul Francis Michaloski, Rochester, NY (US); Duncan Christopher Spaulding, Fairport, NY (US)

(73) Assignee: Corning Incorporated, Corning, NY (US)

( * ) Notice: Subject to any disclaimer, the term of this patent is extended or adjusted under 35 U.S.C. 154(b) by 46 days.

(21) Appl. No.: 15/886,245

(22) Filed: Feb. 1, 2018

(65) Prior Publication Data
US 2018/0217309 A1 Aug. 2, 2018

Related U.S. Application Data

(60) Provisional application No. 62/552,810, filed on Aug. 31, 2017, provisional application No. 62/453,844, filed on Feb. 2, 2017.

(51) Int. Cl.
*G02B 5/30* (2006.01)
*G02B 27/00* (2006.01)
(Continued)

(52) U.S. Cl.
CPC ............ *G02B 5/3083* (2013.01); *B23P 19/04* (2013.01); *G02B 27/0025* (2013.01); *G02B 30/25* (2020.01); *G02F 2202/40* (2013.01)

(58) Field of Classification Search
CPC .. G02B 5/3083; G02B 27/26; G02B 27/0025; G02B 30/25; B23P 19/04; G02F 2202/40
See application file for complete search history.

(56) References Cited

U.S. PATENT DOCUMENTS 5,247,176 A * 9/1993 Goldstein ................. G01J 4/00
250/338.1
7,251,029 B2 7/2007 Kishikawa et al.
(Continued)

FOREIGN PATENT DOCUMENTS

DE 102005022459 A1 * 11/2006 ............ G02B 21/02
DE 102005022459 A1 11/2006

OTHER PUBLICATIONS

Beck et al. (DE 102005022459); Optimizing Quality of Optical Systems; EPO English Machine Translation; Aug. 5, 2019, pp. 1-6.*
(Continued)

*Primary Examiner* — Bayan Salone
(74) *Attorney, Agent, or Firm* — Smit Kapadia

(57) ABSTRACT

According to some embodiments a method of assembling an optical system comprises steps of: measuring retardance profiles of a plurality of optical elements, relatively positioning the optical elements in relative orientations that enhance complementarity between the retardance profiles of the optical elements, and securing the combinations of relatively oriented optical elements together, to control or minimize the combined retardance of the stacked optical elements.

3 Claims, 7 Drawing Sheets

(51) Int. Cl.
*G02B 30/25* (2020.01)
*B23P 19/04* (2006.01)
*G02B 27/26* (2006.01)

(56) References Cited

U.S. PATENT DOCUMENTS

| | | |
|---|---|---|
| 7,738,172 B2 | 6/2010 | McGuire, Jr. |
| 9,019,497 B2 | 4/2015 | Wang |
| 9,254,538 B2 | 2/2016 | Grejda et al. |
| 2004/0056051 A1 | 3/2004 | Murakoshi |
| 2008/0151245 A1 | 6/2008 | Fiolka |
| 2009/0103180 A1* | 4/2009 | McGuire, Jr. ............ G02B 1/08 359/485.02 |
| 2010/0103420 A1 | 4/2010 | Pahl et al. |
| 2015/0346488 A1 | 12/2015 | Werschnik et al. |

OTHER PUBLICATIONS

Burnett et al; "Intrinsic Birefringence in Calcium Fluoride and Barium Fluoride"; Physical Review B, vol. 64, 241102-1-241102-4 (2001).
Hinds Instruments "DUV Birefringence Measurement System"; http://www.hindsinstruments.com/products/birefringence-measurement-systems/duv/; 7 Pages; 2018.
International Search Report and Written Opinion PCT/US2018/016629 dated May 16, 2018.

* cited by examiner

METHOD OF ASSEMBLING OPTICAL SYSTEMS AND MINIMIZING RETARDANCE DISTORTIONS IN OPTICAL ASSEMBLIES

This application claims the benefit of priority under 35 U.S.C. § 119 of U.S. Provisional Application Ser. No. 62/453,844, filed on Feb. 2, 2017 and 62/552,810, filed on Aug. 31, 2017, the contents of both are relied upon and incorporated herein by reference in their entirety.

TECHNICAL FIELD

The invention relates to optical system assemblies and particularly to the choosing complimentary optical elements and to stacking optical elements relative to one another based on retardance, and in particular to assembling of optical systems based on retardance.

BACKGROUND OF THE INVENTION

Many optical system assemblies have strict requirements for optical performance such as high transmission, low pupil non-uniformity, low RMS wavefront errors, and low transmitted wavefront asymmetries. Design and tolerance considerations play important roles in meeting wavefront performance requirements. For example, design forms are often chosen to reduce sensitivity to expected types of optical aberrations (wavefront errors) accompanying the manufacture of optical elements, and tolerances of the optical elements are chosen with respect to the design sensitivities so that manufacturing variations do not severely influence the system level performance. Nevertheless, during the optical assembly even properly designed and manufactured optical elements, when stacked together can introduce additional wavefront errors that degrade overall performance of an optical assembly.

For optical systems where polarized light is used for imaging or illumination, the transmission characteristics of the optical elements usually drive material, design, and tolerancing choices for the optical system assemblies. For example, optical materials may be chosen for their index of refraction and optical transmission properties to meet basic imaging requirements.

SUMMARY OF THE INVENTION

According to the embodiments described herein, method of assembling an optical system comprising a plurality of optical elements, the method comprising steps of:
  (a) measuring retardance profiles of a plurality of optical elements,
  (b) relatively positioning at least some of said plurality of optical elements with respect to one another in relative orientations that enhance complementarity between the retardance profiles of said optical elements, thus forming combinations of relatively oriented optical elements; and
  (c) securing the combinations of relatively oriented optical elements together as stacked optical elements to control or minimize combined retardance of the stacked optical elements forming the compound optical system.

According to some embodiments the step of measuring retardance profiles of the plurality of optical elements comprises measuring retardance azimuthal profiles of the plurality of optical elements
a) (a) with a polarimeter comprising a light source, at least two optical polarization elements, and a detector capable of detecting polarization changes at the wavelength of interest,
b) (b) by rotating two of said at least two optical polarization elements relative to at least one of said plurality of optical elements.

According to some embodiments the step of relatively positioning the optical elements with respect to one another comprises: relatively positioning the optical elements in relative orientations that enhance complementarity between the retardance azimuthal profiles of the optical elements.

According to some of the embodiments described herein, a method of assembling an optical system including a plurality of optical elements comprises steps of:
  a) measuring retardance azimuthal profiles of the plurality of optical elements with a polarimeter comprising a light source, at least two optical polarization elements, and a detector capable of detecting polarization changes at the wavelength of interest, by rotating two of said at least two optical polarization elements relative to at least one of said plurality of optical elements,
  b) relatively positioning the optical elements in relative orientations that enhance complementarity between the retardance azimuthal profiles of the optical elements; and
  c) securing the combinations of relatively oriented optical elements together as stacked optical elements to control or minimize the combined retardance of the stacked optical elements.

In some embodiments, the measuring step further comprises rotating at least one of said plurality of optical elements.

According to some of the embodiments described herein, a method of assembling an optical system including a plurality of optical elements comprises steps of:
a) situating at least one optical element between two optical polarization elements;
b) providing a light beam incident on said at least one optical element at a specified plurality of locations, at specified incident angles, such that the light beam propagates through the at least one optical element and through the two optical polarization elements and is detected by an optical detector;
c) rotating at least one of the two optical polarization elements;
d) collecting light beam intensity data associated with the detected light beam as at least one of the two optical polarization elements is rotated;
e) determining retardance azimuthal profiles for said at least one optical element by determining the polarization state of the detected light beam that propagated through said at least one optical element and said two optical polarization elements, based on the light beam intensity data;
f) situating another optical element between the two optical polarization elements,
g) repeating steps (b through e) of providing, rotating, collecting and determining retardance azimuthal profile(s) for said another optical element;
h) relatively positioning said at least one optical element and said another optical element in relative orientations that enhance complementarity between the retardance azimuthal profiles of said at least one optical element and said another optical element, thus forming combinations of relatively oriented optical elements, and securing the combinations of relatively oriented optical elements together as stacked optical elements, to control or minimize combined retardance of the stacked optical elements forming the optical system.

According to some embodiments, the at least one optical element is not situated between the two optical polarization elements during the step of determining retardance azimuthal profiles for said another optical element. According to other embodiments, the at least one optical element and the another optical element are situated between the two optical polarization elements during the step of determining combined retardance azimuthal profile for said at least one optical element and said another optical element.

In some embodiments method of assembling an optical system including a plurality of optical elements comprises steps of:
a) situating at least one optical element between two optical polarization elements;
b) providing a light beam incident on said at least one optical element at specified plurality of locations, at specified incident angles, such that the light beam propagates through said at least one optical element and the two optical polarization elements, and is detected by an optical detector;
c) rotating at least one of the two optical polarization elements;
d) collecting beam intensity data associated with the detected light beam as at least one of the two optical polarization elements is rotated;
e) determining polarization state of the detected light beam that propagated through said at least one optical element and two optical polarization elements based on the beam intensity data;
f) situating an additional optical element adjacent to said at least one optical element and between the two optical polarization elements;
g) repeating steps of providing, rotating, collecting, and determining combined retardance azimuthal profile for a combination of the at least one optical element and the additional optical element;
h) relatively positioning the at least one optical element and the additional optical element in relative orientations that enhance complementarity between the retardance azimuthal profiles of said at least one optical element and said additional optical element, thus forming combinations of relatively oriented optical elements, and securing the combinations of relatively oriented optical elements together as stacked optical elements to control or minimize combined retardance of the stacked optical elements forming the optical system.

According to the exemplary embodiments described herein, the exemplary methods disclosed herein may be utilized for reducing sources of error in optical assemblies that might otherwise arise between properly designed, toleranced, and manufactured optical elements by controlling and optimizing retardance while stacking these optical elements. The retardance characteristics (e.g., retardance profiles) of the optical elements intended for use with other optical elements can be measured in advance of assembly, and/or during assembly. The retardance characteristics measurements can be used to arrange the stacking optical elements (i.e., the optical elements that are being stacked) during assembly or to prearrange the stacking elements in proper orientations in advance of final assembly. In situ retardance characteristics measurements (e.g., measured retardance profiles) of optical elements during assembly can be used in combination with measurements of the optical elements made prior to the assembly for such purposes as diminishing cumulative errors in the growing stack of optical elements, or by optimizing retardance performance of the growing stack of optical elements.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiment(s), and together with the description serve to explain principles and operation of the various embodiments.

BRIEF DESCRIPTION OF THE DRAWING FIGURES

DETAILED DESCRIPTION

Figure 1:
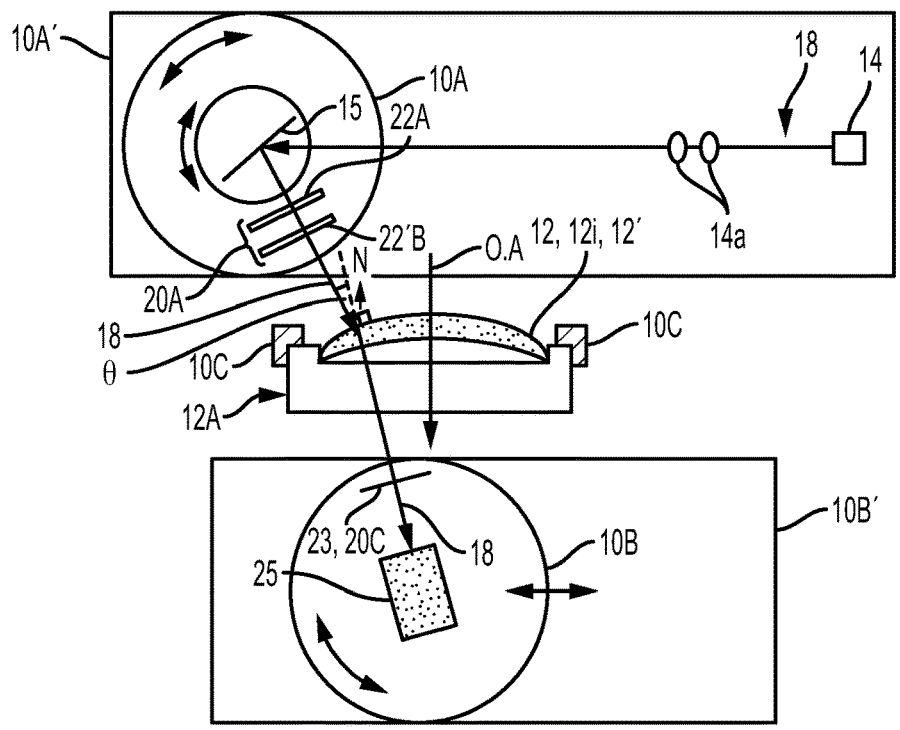
FIG. 1 is a schematic diagram of a rotating analyzer polarizer for measuring retardance profiles of an optical element, according to one embodiment.

A "retardance profile" of a lens or an optical element is retardance of the optical element as a function of radial distance from its optical axis (or as a function x-y position) and azimuthal (or rotational) position at that radial distance (or the X-Y position).

A "complementarity" between the retardance profiles means that two or more optical elements are oriented relative to one another such that maxima positions in the retardance profile of the optical elements do not substantially overlap, and preferably such that the maxima position in the retardance profile of one of the optical elements corresponds substantially to the minima in the retardance profile of another optical element, minimizing the overall retardance of the optical system.

The "stacked optical elements" are a plurality of optical elements that are situated adjacent to one another in specified orientations and at specified distances from one another.

The "combined retardance performance" or "combined retardance" is retardance performance (i.e., overall retardance) of a plurality of optical elements forming stacked optical elements or an optical system.

The term "lens" as used herein refers includes any of the following: an optical assembly, an optical sub-assembly (i.e., a group of optical elements forming a portion of the larger optical assembly), an optical element (e.g., single lens element, or a cemented lens component (e.g., a doublet)) a beam splitter, a lens element or a lens component with a coating thereon, a reflective or partially reflective optical component, an optical plate, or glass window).

Birefringence is an intrinsic property of many optical materials, and may be induced by external forces applied to the material. Retardation or retardance represents the integrated effect of birefringence acting along the path of a light beam that traverses a sample of the optical material. If the incident light beam is linearly polarized, the two orthogonal components of the polarized light will exit the sample with a phase difference, called the retardance. The fundamental unit of retardance is length, such as nanometers (nm). It is frequently convenient, however, to express retardance in units of phase angle (waves, radians, or degrees), which is proportional to the retardance (nm) divided by the wavelength of the light (nm).

Some optical materials will exhibit ranges of birefringence or varying degrees of retardance in the presence of stress from fabrication or mounting processes and the optical elements made of these materials when stacked together, can introduce additional wavefront errors that degrade overall performance of an optical assembly. Furthermore, polarization characteristics of optical elements or assemblies of optical elements are affected by not only intrinsic properties of optical materials, but also by the optical elements' fabrication processing, mounting induced stress, and by the optical coatings present on the optical elements. The methods described herein advantageously provide a way for understanding the impact of the coatings, and/or mounting, and/or of the assembly (i.e., how the optical elements are assembled together or relative to one another) on retardance, and thus allow one to minimize their impact, and/or to characterize retardance of the optical sub-assemblies to optimize the performance of the optical systems.

According to some embodiments, the retardance of optical elements, optical sub-assemblies, etc., are premeasured with a polarimeter. More specifically, a polarimeter is a device utilized herein for measuring the retardance of optical materials. Since birefringence relates to applied stress, the retardance profiles of the optical element relates to the stress distribution induced in the optical element—e.g., stress induced by a coating, an optical holder, or by the way the optical element was manufactured. Such stresses are cumulative, and can affect the overall performance of the optical system. Retardance measurements of the lens optical elements can be advantageously utilized to select the appropriate optical elements and/or their orientations relative to one another, so as to improve the retardance performance of the assembled optical system. In the embodiments described herein a polarimeter is utilized to measure the retardance of lenses, optical systems, optical elements, or optical sub-assemblies. A polarimeter may utilize, for example, a rotating analyzer. An example of a polarimeter is a rotating analyzer Stokes polarimeter, e.g., a rotating-wave-plate Stokes Polarimeter.

According to some embodiments described herein the method comprises the steps of measuring the optical retardance of optical elements or optical sub-assemblies or assemblies and then optimizing performance of the stacked optical elements, or the optical systems based on the retardance measurement results. For example, a rotating analyzer Stokes polarimeter is utilized herein to deliver to optical elements, optical sub-assemblies, or full optical assemblies a laser beam from a laser source at a specific wavelength of interest (e.g., the operating wavelength). According to the exemplary embodiments described herein the polarimeter delivers small diameter laser (light) beam with a known or characterized polarization state to the optical element, optical sub-assembly, or assembly at the "in-use" angles of incidence to characterize the retardance through the element, optical sub-assembly, or assembly at the specified location(s). The "in-use" angles are the angles at which the light will be incident at the optical element(s) in the final optical system, the optical element, or the assembly of optical elements can be rotated to a plurality of azimuthal locations to characterize the retardance resulting in an azimuthal retardance profile for the optical element, assembly, or assembly. The retardance azimuthal profiles of the optical elements can be used to optimize the rotation of the optical elements relative to one another such that the combined retardance rotation of the optical elements is minimized.

According to some embodiments a method of assembling an optical system comprising a plurality of optical elements, the method comprising the steps of:

(a) measuring retardance profiles of a plurality of optical elements, (b) relatively positioning the optical elements in relative orientations that enhance complementarity between the retardance profiles of the optical elements, and (c) securing the combinations of relatively oriented optical elements together to control or minimize combined retardance of the stacked optical elements.

For example, the optical elements may be positioned such that the maximum values in the retardance profile of one or more optical elements correspond to the minimum values in the retardance profile of at least one other optical element.

According to some of the embodiments described herein the optical elements or optical sub-assemblies being evaluated or characterized for retardance may comprise optical elements with concave, convex, plano, aspheric, or freeform-figured lens elements made from optical materials appropriate for the optical system. According to the embodiments described herein the characterization comprises determining the following:

a) Aperture zone of interest for the lens, for example determining radial location on the front surface of the optical element or the optical sub-assembly or assembly used in retardance characterization;

b) Angle of Incidence (AOI) at that zone;

c) Angle of Refraction (AOR) out the second (or last) surface of the lens, e.g., the last or the rear facing surface (surface facing the detector) of the optical element or the optical sub-assembly.

The polarimeter 10 is capable of positioning a laser light beam (measurement beam) at the required aperture zone and AOI (angle of incidence) of the lens 12, as needed for evaluation. The polarimeter comprises: (a) laser source with conditioning optics to direct and size (or collimate) the measurement light beam incident on the lens under test (i.e., the lens 12 undergoing characterization); and (b) polarization optics comprising one or more of polarization elements (for example, linear polarizers and quarter (¼) wave plates) for conditioning the polarization state of the light beam incident on the lens 12.

FIG. 1 is a schematic of an exemplary embodiment of a rotating analyzer polarimeter 10. In this embodiment, the light beam 18 is sized and/or collimated by conditioning optics 14A and is then delivered to a lens 12 at a specific incidence location (radial and azimuthal position, specific angle of incidence) by movement of the linear and rotary stages 10A' and 10A. In FIG. 1 embodiment lens 12 is an optical element 12$i$, and more specifically a single lens element 12). In the embodiments described herein lens 12 may be, for example, an optical assembly, an optical sub-assembly (i.e., a group of optical elements forming a portion of the larger optical assembly), an optical element 12$i$ (e.g., single lens element, or a cemented lens component (e.g., a doublet), a beam splitter, an optical plate, or glass window). In this embodiment, the polarization of the incoming light beam incident on optical element 12$i$ (e.g., the exemplary meniscus lens element 12') is controlled by two optical polarization elements—the linear polarizer 22A and quarter wave plate 22B (also referred herein as ¼ wave plate 22B). The linear polarizer 22A and ¼ wave plate 22B in conjunction with one another produce a circularly polarized light beam. In this embodiment another set of linear and rotary stages 10B', 10B position a rotating analyzer 23 and detector 25 so as to enable them to detect/measure the intensity of the laser light beam 18 transmitted through the analyzer 23. The collected and measured beam intensity is used to calculate electric field vector amplitudes and retardance of the lens 12, (e.g., of the optical element 12'), optical sub-assembly, or optical assembly) under evaluation. The measurement can be repeated to map the retardance performance for other radial and azimuthal positions of the lens 12.

As described above, FIG. 1 illustrates schematically device in which a beam from the light source is 14 directed to a lens 12 under evaluation by using a series of linear and rotary stages. The light source 14 is a laser which can be, for example, continuous wave, quasi-continuous wave, or pulsed. The light source 14 may be of any wavelength of interest, for example DUV wavelengths (193 nm<λ<400 nm). In the embodiment of FIG. 1 the linear stage 10A' and rotary stage 10A in conjunction with one another enable displacement and pointing of the light beam 18 to a location on the lens 12 through which the retardance of the lens 12 can be characterized. As described above, the rotating analyzer polarimeter 10 shown in FIG. 1 can be utilized to measure the retardance of a single optical element 12' or a retardance of an optical sub-assembly, or of an assembly of optical elements. For example, instead of the single optical element 12' an entire assembly sub-assembly comprising a plurality of optical elements is placed into a lens holder 12A, and the light beam 18 is passed through the entire lens assembly (or the optical sub-assembly) toward the rotating analyzer and detector 23, 25, so as to enable measurement of the intensity of the light beam transmitted through the lens assembly or the optical sub-assembly.

The stages 10A and 10A' also provide positioning for polarization component(s) that condition polarization of the incoming beam 18 incident on the lens 12. For example, polarization component 20A changes polarization of the optical beam 18 to a predetermined polarization, and may comprise, for example, one or more linear polarizers, ½ wave plates, and/or ¼ wave plates. In the embodiment of FIG. 1, polarization component 20A includes a linear polarizer 22A and a ¼ wave plate 22B with its fast axis oriented at 45° to the linear polarizer axis, which creates circular polarization. In FIG. 1 embodiment stages 10A and 10A' are situated upstream from the lens 12.

The lens 12 (for example, an optical element 12', optical sub-assembly, or lens assembly) is mounted to a rotary stage 10C that provides rotation of the lens 12 (e.g., optical element 12$i$) around its optical axis OA. This allows for measurement of azimuthal locations of the lens 12 by indexing or rotating the rotary stage 10C for measurements made off axis (i.e., not on the optical axis). The transmitted light beam 18 (i.e., the light beam transmitted through the optical element, optical sub-assembly, or lens assembly) is passed through at least one polarization component 23 and is then collected by a detector 25. In the embodiment shown in FIG. 1, the at least polarization component 23 and detector 25 are mounted on linear and rotary stage(s) 10B, 10B'. The linear and rotary stages 10B', 10B are located downstream of the linear and rotary stages 10A', 10A and enable translation and rotation of the polarization component(s) 23 and the detector 25 relative to the lens 12.

The analyzer 23 is an optical polarization element. For example, in some embodiments, analyzer 23 is a linear polarizer, but in other embodiments it may comprise of other polarization components. According to some embodiments, the linear analyzer 23 is mounted to rotary stage which rotates around the beam axis. The detector 25 is sensitive to changes of the intensity of the light passing through the rotating analyzer 23, can detect these changes, and the changes in intensity can be recorded along with the analyzer's position (i. e., we are recording the intensity and the analyzer position).

The rotating analyzer polarimeter 10 shown in FIG. 1 is an example of an instrument that can be used for obtaining retardance characteristics (e.g., retardance azimuthal profiles) of lens 12, and more specifically, can provide retardance characteristics of the lens 12 along a specified optical path. A light source 14, such as a laser diode, emits an optical beam 18 of coherent light, and is reflected by a rotating or scanning fold mirror 15 situated on the rotary stage 10A (also referred to herein as the a polarizer rotation stage) towards an lens 12 such as the an optical element 12$i$ which sits in the path of the optical beam 18.

The polarized beam portion of the beam 18 propagates through the lens 12 (e.g., through the optical element 12$i$ such as, for example, lens element 12') situated in a lens holder such as the holder 12A. The holder 12A supports lens 12 in a predetermined position, and is capable of rotation. In this embodiment, after exiting the optical element 12$i$, the polarized beam enters a linear stage 10B of the polarimeter 10. The polarized beam 18 propagates through another (second) polarization element 20C (in this embodiment the rotating analyzer 23), and is detected by the detector 25.

Figure 2A:
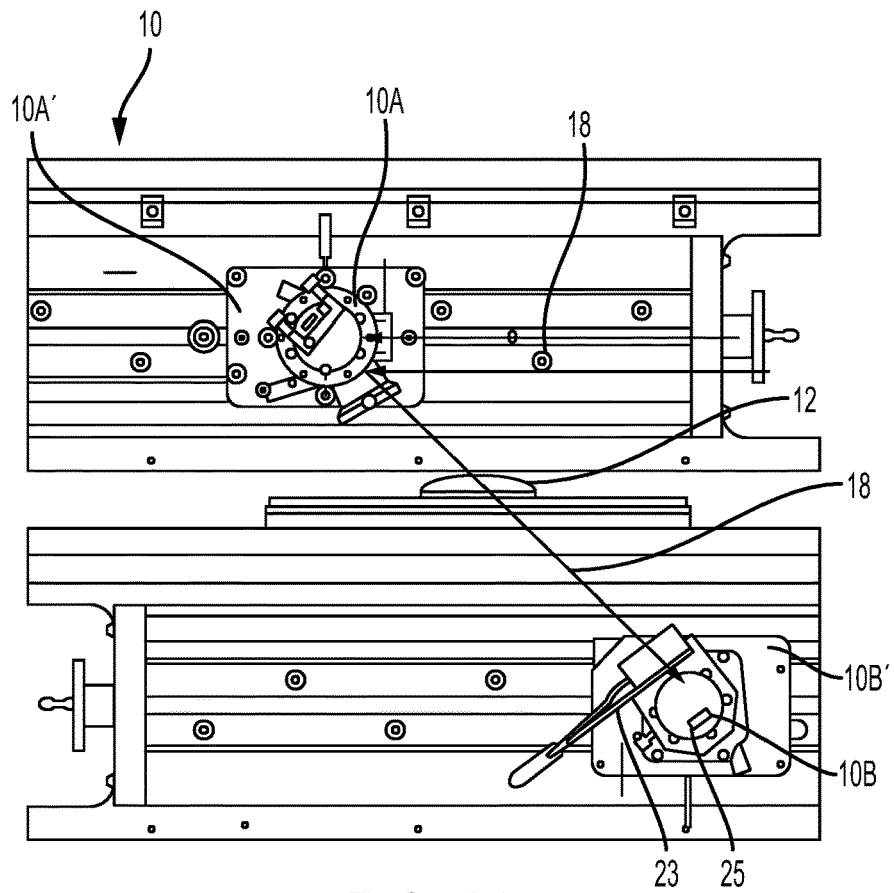
FIGS. 2A, 2B and 2C illustrate the mechanical details of the palarimeter, according to one or more embodiments.
Figure 2B:
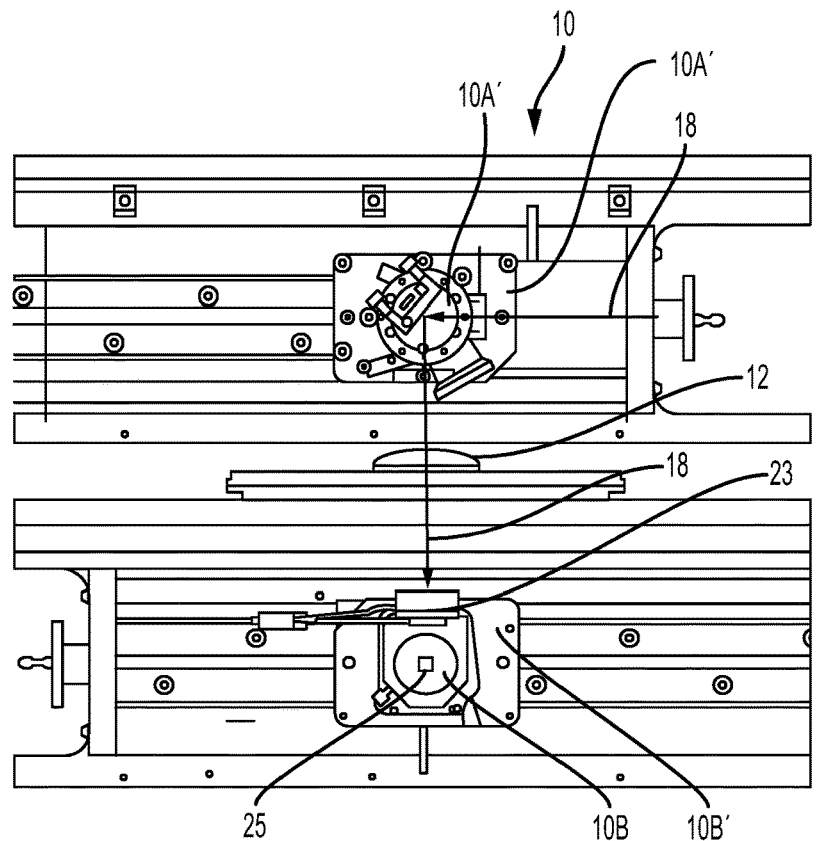
Figure 2C:
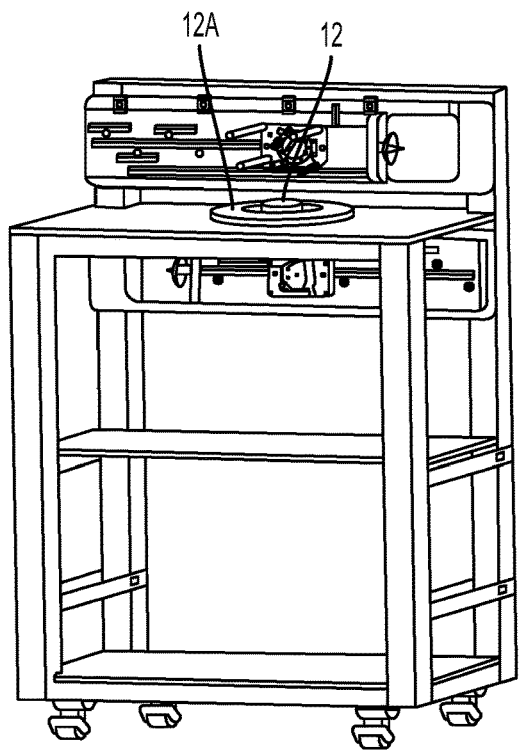

FIGS. 2A and 2B illustrate mechanical model details of an exemplary embodiment of the polarimeter 10, and illustrate beam steering capability utilized to control the position and direction of the input beam 18 for different measurement locations on the lens 12. More specifically, FIGS. 2A and 2B illustrate "on-axis" and "off-axis" positioning of the incident beam 18 on an optical element or an assembly of optical elements (e.g., a lens or lens assembly). FIG. 2A illustrates an "off-axis" measurement, and FIG. 2B illustrates an "on-axis" measurement of an optical element 12$i$. FIG. 2A shows that the light beam 18 reflects from the scanning mirror 15 situated on situated on stages 10A, 10A', and the reflected beam is then incident on the lens 12 at an angle θ to the normal N, rather than at normal incidence. FIG. 2A also shows that the analyzer 23 and detector 25 are placed normal to the incident beam 18. FIG. 2B shows that the light beam 18 reflects from the scanning mirror 15 situated on stages and that the reflected light beam 18 is then incident on the lens 12 at the normal incidence. FIG. 2B also shows that the analyzer 23 and detector 25 are placed normal to the incident beam 18. FIG. 2C is a perspective view of the polarimeter 10 of FIGS. 2A and 2B. As shown in FIGS. 2A-2C, the lens 12 (for example the optical element 12$i$) is positioned on a rotary stage (to rotate about its axis) in order to provide rotation of the optical element 12$i$, allowing the retardance characterization/evaluation to be provided for any radial or azimuthal position on the optical element.

Initial retardance measurements can be made without the optical elements(s) in place (i.e., without the lens 12, or without optical element 12*i* in the holder 12A), in order to characterize the polarization of the incident beam 18 with characterization optics. Such initial measurements can be utilized, for example, for calibration of the analyzer polarimeter 10, e.g., to calibrate the coordinate system of the analyzer polarimeter 10.

According to some embodiments, instead of the individual optical element 12*i*, several optical elements (e.g., an optical sub-assembly, or a lens assembly) may also be positioned in the holder 12A. The holder 12A allows for rotation of the optical sub-assembly or the lens assembly under evaluation, allowing the retardance to be characterized at any radial or azimuthal position on the entire sub-assembly, or the assembly of the optical elements.

The data collected from the detector (i.e., intensity) and analyzer's position can be used to determine polarization performance of the optical sub-assembly, or lens assembly that is being tested. Well-known relationships exist for taking the data collected for specific polarizer/analyzer arrangements and calculating Stokes coefficients, and according to the embodiments described herein these relationships can be advantageously used to describe the polarization state of the laser beam 18 existing the optical element, or optical sub-assembly. That information combined with the initial measurements of the polarization state made with the optical element(s) not present inside the measurement cavity (i.e., not in the holder 12A) can be used to determine the amount of polarization change caused by the lens element, optical sub-assembly, or lens assembly. (As used herein, the term "measurement cavity" means the space between polarization component 20A and the rotating analyzer 23). The initial measurements of the polarization state (the initial retardance measurements) made with the optical element(s) absent from the measurement cavity can be utilized to verify that the polarimeter 10 is set up properly. In addition, In addition, to calculate "absolute" retardance performance of the lens 12, we can subtract the measurements the measurements done without the lens component in the measurement cavity from the measurements obtained when the lens component was situated inside the measurement cavity.

Figure 3A:
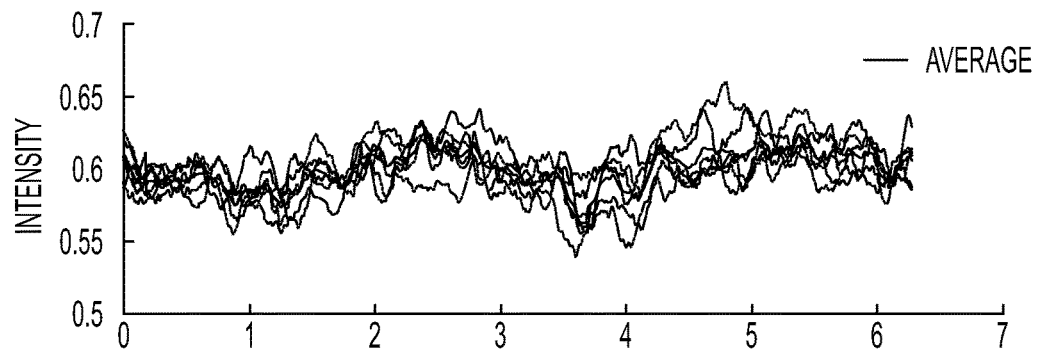
FIGS. 3A and 3B illustrate exemplary data collect by an exemplary analyzer polarizer, according to one embodiment described herein.
Figure 3B:
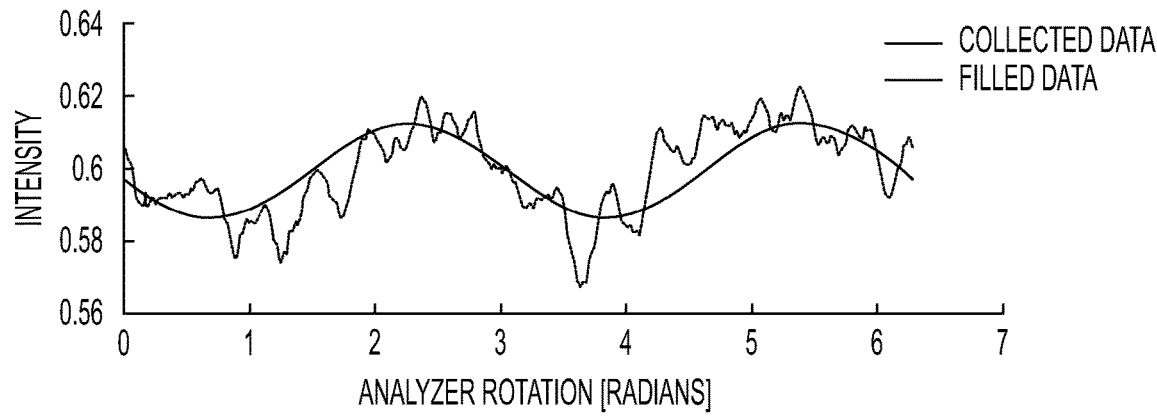

FIGS. 3A and 3B illustrate exemplary data collected by the rotating analyzer 23 in conjunction with the detector 25, according to one embodiment described herein. FIG. 3A shows the detected beam intensity (signal intensity) corresponding to six (6) revolutions of the linear analyzer 23. More specifically, in FIG. 3A intensities for each full revolution of the analyzer 23 are shown as thin gray color curves. The intensities corresponding to the six revolutions are averaged together, with average intensity shown in FIG. 3A by the dark, thicker (solid) curve. In FIG. 3B the average intensity corresponding to the collected data (shown by dark thicker solid curve in FIG. 3A and as a dashed curve in FIG. 3B) is fit with a three-term sine fit (shown by a thin sinusoidal type curve in FIG. 3B), to describe the first three Stokes coefficients ($S_0$, $S_1$, and $S_2$) which can be used to calculate electric field vector amplitudes ($E_x$, $E_y$) and retardance. That is, FIGS. 3A and 3B illustrate examples of the raw data in which multiple revolutions (for this example, six full revolutions of the analyzer 23) are averaged and then fit to a sine curve in order to determine a bias term and two sinusoidal coefficients to represent the signal detected by the detector 25 while the analyzer 23 is rotating. These coefficients can be used to calculate electric field amplitudes and retardance for the measurement. During the measurements, the optical element 12*i* can be rotated to different azimuthal positions and the same measurement cycle can be repeated (rotating analyzer, then recording analyzer position and detected signal intensity). This method provides the retardance data for different locations on optical element 12*i*. Similar measurements can be done for the entire optical assembly or lens sub-assembly to determine or provide the retardance data for different locations, through the entire optical assembly or the optical sub-assembly (or lens 12) situated in the lens holder 12A. Exemplary results of the retardance data (in degrees, measured with a laser having a wavelength k=266 nm) obtained by this method are shown for multiple azimuthal locations in FIG. 4.

Figure 4:
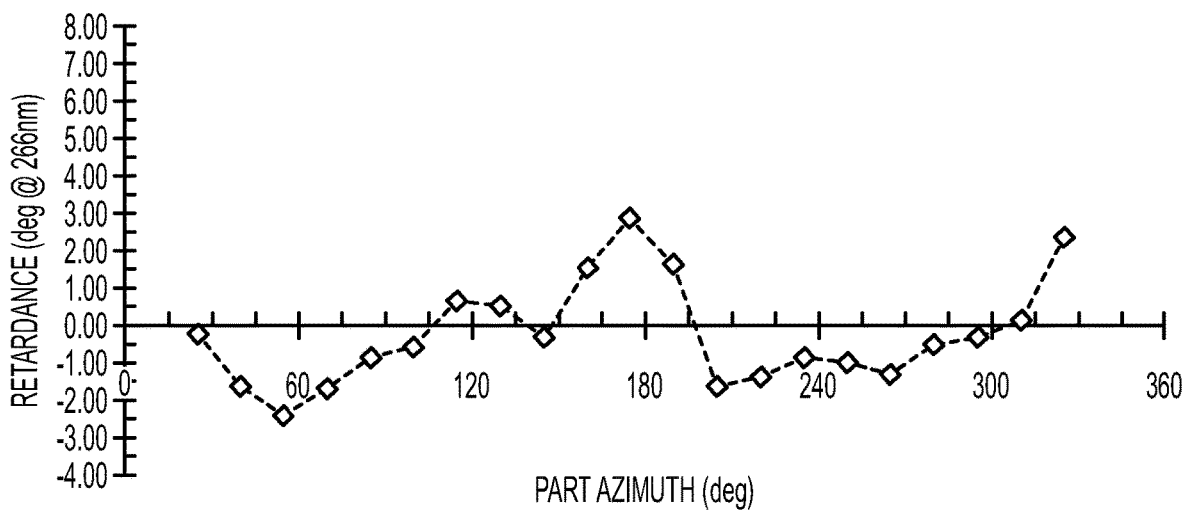
FIG. 4 illustrates exemplary retardance profile, according to one embodiment.

More specifically, FIG. 4 illustrates retardance measurement results (retardance profile) for a lens 12 (in this embodiment optical sub-assembly that comprises an optical element with a coating thereon). The vertical axis represents retardance in units of degrees. The retardate was measure with a laser beam 18 having the wavelength of 266 nm (which, in this embodiment, is the operating wavelength that assembled optical system). The horizontal axis represents the azimuth location of the lens 12 (degree of rotation about its optical axis). In this embodiment a coated optical element 12*i*, 12' is mounted in its lens holder 12A and retardance measured in 15° azimuthal intervals, radially at the location of 90% of the CA (clear aperture) at the light beam's angle of incidence (AOI) that the optical element will encounter when it is placed in the full optical assembly. FIG. 4 plot shows azimuthal retardance, with "diamond" symbols corresponding to the measured retardance at each specified location on the optical element 12*i*, 12'. The retardance profile of this optical element can be compared to the measured azimuthal retardance of other optical elements 12*i* in the optical assembly so as to optimize the polarization performance of the entire optical assembly by choosing the proper optical elements and/or rotating the optical elements to place them in optimum orientations relative to one another so as to minimize retardance and improve polarization performance of the entire optical assembly.

The locations (or zones) of the optical element 12*i* to be tested or evaluated for retardance characteristics can be chosen because of the known system level constraints on polarization performance. In addition, the angles of incidence of the measurement optical beam 18 on the optical elements should match the angles (be similar or the same) present for the optical elements when they operate inside of the completed assembly. Therefore, the measurement can be used to characterize the component-level polarization impact to the system (via retardance profiles of the optical element(s) 12*i*) prior to integration of the optical elements(s) 12*i* into the complete optical assembly.

It should also be noted that the exemplary embodiments of method described above utilized the intensity variations obtained at discrete azimuthal positions on the optical element 12*i* (optical sub-assembly, etc.) as the analyzer 23 was rotating through multiple revolutions. Alternatively, in other embodiments, the optical element 12*i* rotates and the analyzer 23 is held stationary. That is, intensity data sets obtained when the optical element (sub-assembly, etc.) rotates multiple times for discrete analyzer positions can also be utilized. Subsequent data collections would be required where the analyzer is indexed/rotated a recorded amount and the measurement can be recorded again (multiple lens rotations, record the intensity and part azimuthal position). This method can be used to acquire high spatial resolution retardance characteristics from the lens (e.g., optical element or lens sub-assembly). This spatial resolution would be dictated by the resolution of the device(s) providing the rotation of the lens (motor, encoder, etc.).

Figure 5:
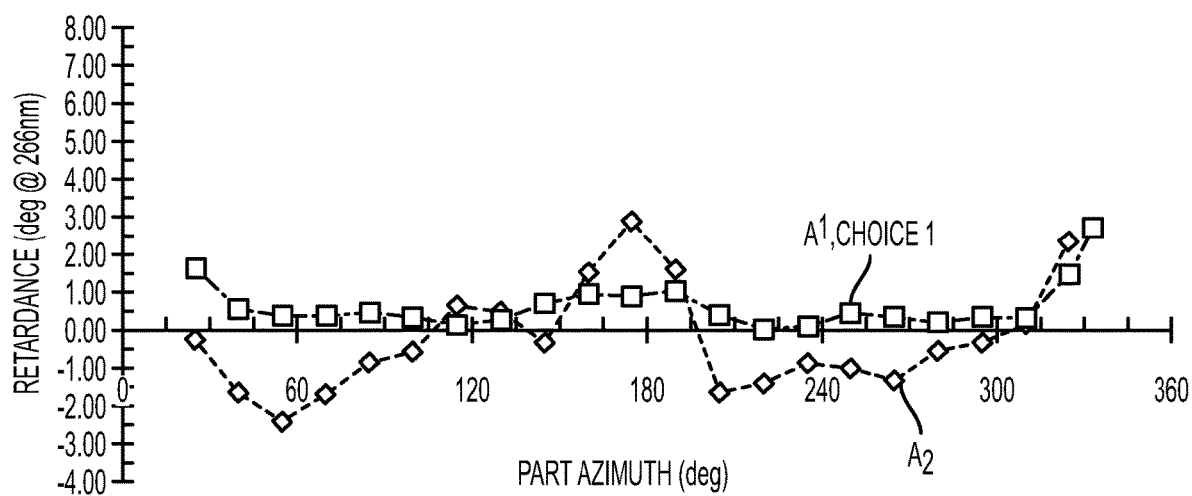
FIG. 5 shows a comparison of azimuthal retardance profiles for different optical elements.

FIG. 5 illustrates a comparison of two azimuthal retardance profiles for two different optical elements, showing the resolution or the exemplary retardance measurement system. The data points characterized with squares show lower retardance with less azimuthal variation than the data points characterized by diamonds.

More specifically, FIG. 5 illustrates typical results from retardance characterizations (in degrees) for two similar optical elements 12$i$, and in this example for two convex/concave lens elements 12' (corresponding to curves A1 and A2), measured with a laser beam (optical beam 18) having the wavelength $\lambda$=266 nm. FIG. 5 illustrates large differences in retardance profiles of these two lens elements. When azimuthal (or radial) retardance profiles can be characterized for a series of optical elements, optical subassemblies, or assemblies as they near completion and integration into the final assembly, the results (retardance profiles of the optical elements) can be used to either:

1) choose among similar optical element (or the optical sub-assemblies) those optical elements (or sub-assemblies) that exhibits less variability and lower values in its retardance profile, so that when assembled into the optical system to the assembled optical system can meet the assembly level (optical system's) retardance performance targets; or (2) based on the retardance profiles of each optical element (or optical sub-assembly), the optical elements (or optical sub-assemblies) can be azimuthally clocked (rotated) so as to minimize or optimize the combined retardance (i.e., the retardance sum) of the optical elements in the completed assembly (e.g., of the completed (i.e., assembled) optical system).

For example, when choosing one of the optical elements characterized in FIG. 5 for use in an optical system, one may prefer to choose the optical element that exhibits less variability and lower values in its retardance profile. That is, in this exemplary embodiment, when choosing optical element 12$i$, 12' for use in the optical system, one would choose the optical element 12$i$, 12' corresponding to the plot with "squares" (labeled as A1, choice #1) rather than the similar optical element that corresponds to the plot with "diamonds" (labeled as A2), because of its lower amplitude retardance, which allows the overall optical system to meet its required system retardance performance.

Figure 6A:
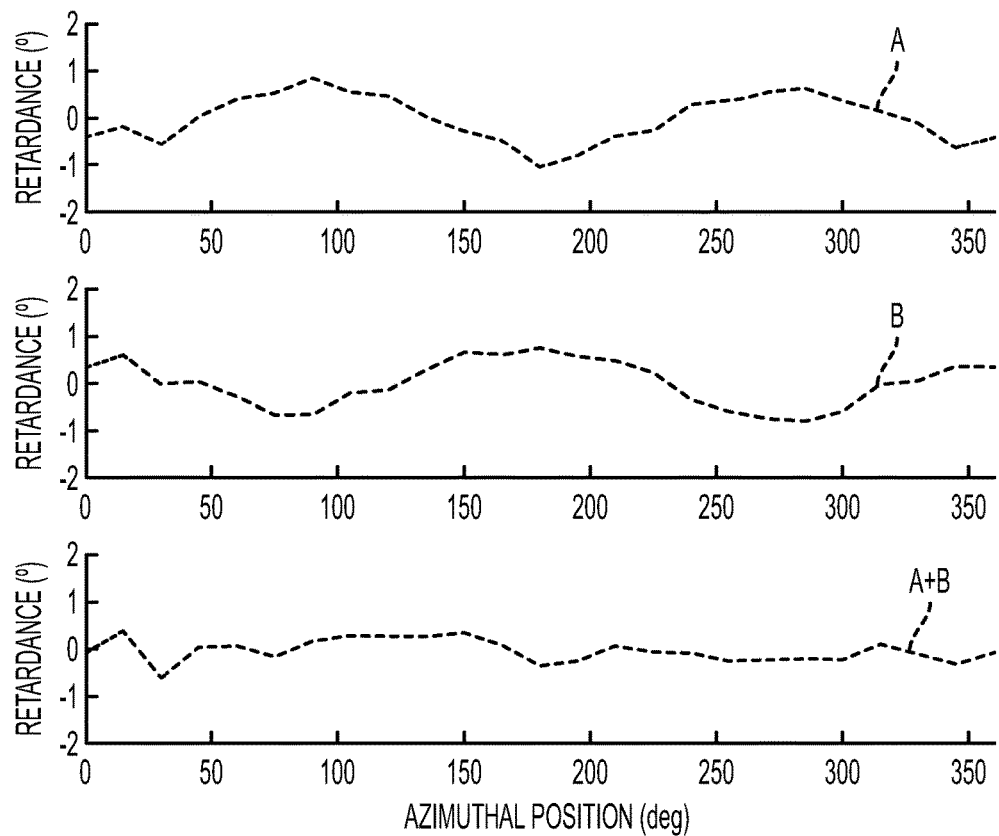
FIG. 6A illustrates retardance measurement optimization for two sub-assemblies of optical elements in a Cartesian coordinate system.
Figure 6B:
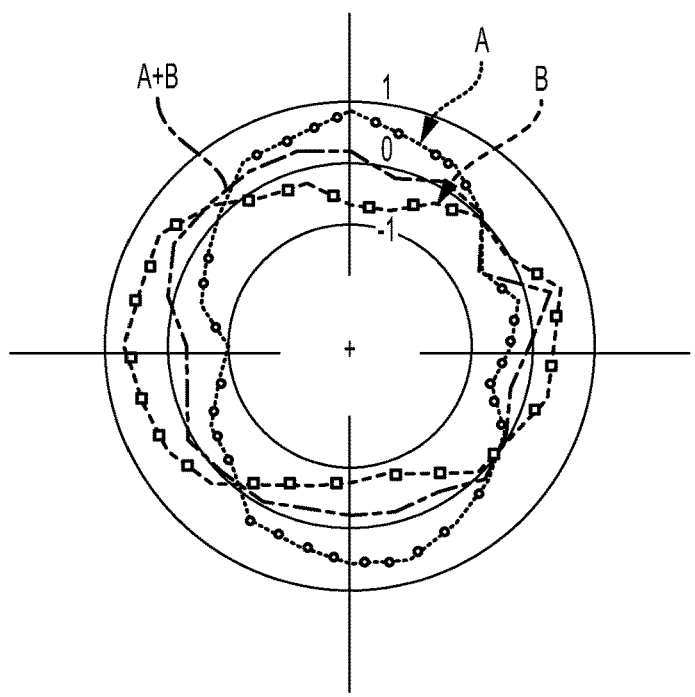
FIG. 6B illustrates retardance measurement optimization for two optical sub-assemblies corresponding to FIG. 6A, but in a polar coordinate system.

Also, for example, one can chose optical elements or optical sub-assemblies that have complimentary retardance profiles to be assembled together. The optical elements (or optical sub-assemblies) can be azimuthally clocked (rotated) relative to one another so as to minimize or optimize the retardance sum (i.e., the combined retardance) of the optical elements in the completed assembly. FIGS. 6A and 6B illustrate retardance data taken on two optical sub-assemblies A and B. More specifically, the two top curves of FIG. 6A illustrate the azimuthal retardance profiles of two different optical sub-assemblies (A and B) that will be assembled together, forming an optical system. Both of the top two curves show the azimuthal retardance profiles which exhibit two maxima and two minima. The bottom plot of FIG. 6A illustrates total retardance this optical system comprising the two sub-assemblies. When the two optical sub-assemblies are rotated relative to one another such that the retardance profiles of the two sub-assemblies (as shown in FIG. 6A) are largely complimentary (in this embodiment the peaks or the maxim(s) of one profile substantially correspond to the valleys or minima in another profile), the resultant retardance profile of the overall, assembled optical system is minimized (as shown by the bottom plot of FIG. 6A). Other elements or sub-assemblies which will be stacked together with the element might also experience similar "two max/min" retardance characteristics because of coatings, optical fabrication residual stresses or stresses for optical mounts. It is then possible for the phase relationship of two sub-assemblies to be clocked (the two subassemblies are rotated relative to another) such that the sum of the two retardance profiles is minimized (e.g., by a 90° rotation of one optical element or sub-assembly with respect to the other optical element or sub-assembly for "2 max/min" profile). The same can be done for optical elements or sub-assemblies with higher numbers of max/min retardance profiles (3, 4, 5, etc.) and orientations chosen to minimize the combined retardance (i.e., the overall retardance, or retardance sum) for the plurality of optical elements in the finished optical system. This results in the combined retardance profile (overall retardance) similar to that shown in the bottom trace in FIG. 6A or as the darker polar coordinate profile in FIG. 6B. The combined retardance is 50% less than that of the individual optical elements because of this optimization during assembly. (More specifically retardance measurement optimization for two lenses or optical sub-assemblies is represented by plots on Cartesian (FIG. 6A) and in polar (FIG. 6B) coordinates. In FIG. 6A, the top plot is the retardance profile measured at a radial zone of 90% of the full aperture as a function of azimuthal position of the optical element A. The middle plot is the retardance profile measured at a radial zone of 90% of the full aperture as a function of azimuthal position of a similar optical element B, that is clocked (rotated) in a preferable manner to optimize the combined retardance performance on in the completed assembly (bottom plot). This is also illustrated in FIG. 6B (polar plot form) where the retardance profile is shown for optical element A as plot A and for optical element B as plot B, and the combined performance (darker plot) is designated as A+B. FIG. 6B also shows that the combined retardance performance (amplitude) is ~50% less than the individual retardance performance of the individual optical elements A and B).

Figure 7A:
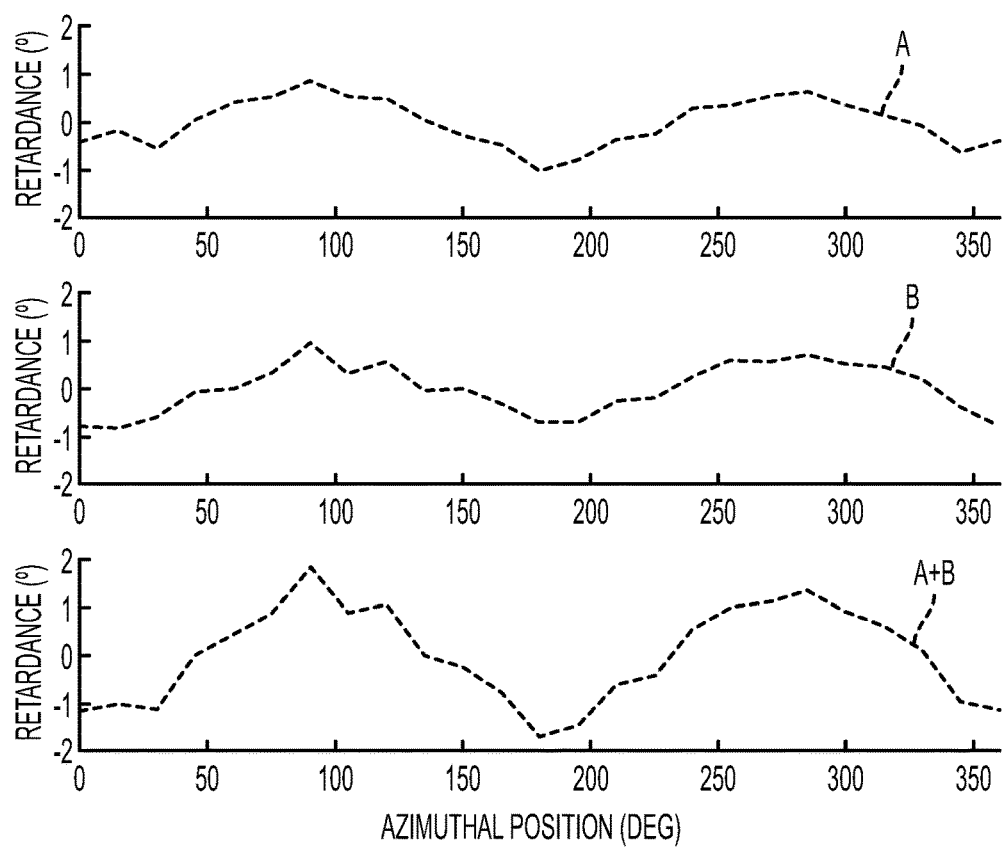
FIG. 7A illustrates retardance measurement optimization for another set of two optical sub-assemblies of optical elements in a Cartesian coordinate system.
Figure 7B:
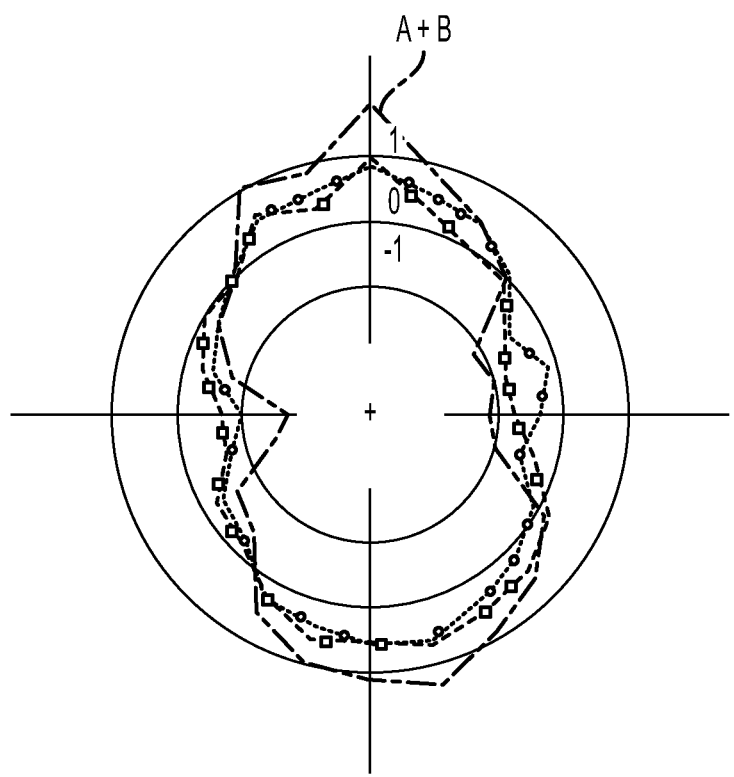
FIG. 7B illustrates retardance measurement optimization for two optical sub-assemblies corresponding to FIG. 7A, but in a polar coordinate system.

FIGS. 7A and 7B illustrate a comparative example. Although the same lenses A and B are utilized, the orientation of lenses (or optical elements, or subassemblies) A and B relative to one another is such that their retardance profiles are no longer complimentary. Instead, FIG. 7A illustrates that positions and orientations (and more specifically azimuthal assembly positions) of optical elements (or subassemblies) A and B are such that their azimuthatral retardance profiles (top two plots) combine to create an overall retardance profile that is larger than the retardance contribution of the individual optical elements (or subassemblies). More specifically, retardance measurement for two optical elements A and B is represented on Cartesian (FIG. 7A) or polar (FIG. 7B) plots. In FIG. 7A, the top plot is the retardance profile measured at a radial zone of 90% of the full aperture as a function of azimuthal position of the optical element A. The middle plot is the retardance profile measured at a radial zone of 90% of the full aperture as a function of azimuthal position of the optical element B when clocked in a manner that negatively impacts (or increases) the combined retardance performance on in the completed assembly (bottom plot). In FIG. 7B, this is shown in polar plot form where the retardance profile is shown for lens or an optical element A as plot A, lens or optical element B as plot B, and the combined performance as plot A+B. In contrast to the results shown in FIGS. 6A and 6B, as shown in FIGS. 7A and 7B the combined retardance performance (amplitude) of the combination of lenses A and B (or subassemblies) is almost two (2) times more than the individual retardance performance of the individual lenses (or of individual subassemblies, or of individual optical elements).

Figure 8:
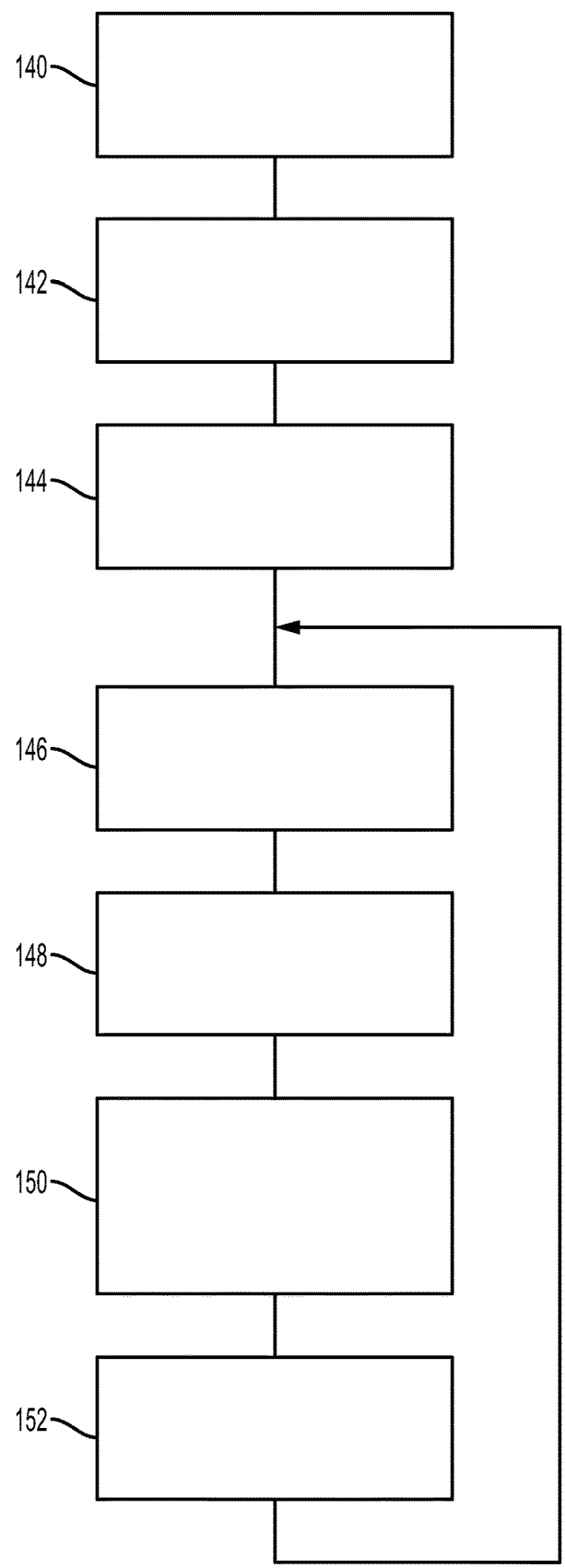
FIG. 8 is a flow chart presenting steps for building an optical system assembly using retardance measurement.

FIG. 8 illustrates a flow chart according to one embodiment of the present invention. More specifically FIG. 8 illustrates exemplary steps for building an optical subassembly or a completed assembly (lens system assembly) utilizing both pre-measurements of the optical elements and in situ measurements of the growing assembly of optical elements.

Step 140: premeasuring (i.e., measuring or obtaining retardance azimuthal profiles) of a plurality of optical elements to obtain their retardance profiles (i.e., measuring or obtaining retardance azimuthal profiles of a plurality of optical elements). These measurements characterize the overall retardance characteristics of each optical element, or retardance characteristics the optical elements at specified locations or zones of interest.

Step 142: selecting optical elements among the plurality of available optical elements to fulfill requirements of an optical assembly. In step 142, the selection is deemed random among corresponding optical elements, but optimum combinations of optical elements could be chosen from among the available optical elements based on pre-measures of the retardance characteristics the optical elements.

Step 144: mounting optical element 12$i$ within an optic holder. (Step 146 begins a cycle where in situ measurements are made of stacked optical elements within a sub-assembly (i.e., a growing assembly), i.e., the optical elements are being stacked and in situ measurements are made of the stacked optical elements. More specifically, the in situ measurements characterize the combination of optical elements (sub-assembly) by retardance azimuthal profile of the entire sub-assembly.)

Step 148: retrieving the pre-measurement results of the next adjoining optical element 12$_{i+1}$.

Step 150: determining from available choices a relative orientation of the next adjoining optical element 12$_{i+1}$ such that retardance azimuthal profiles of the optical elements 12$i$ and 12$_{i+1}$ (or of the optical sub-assembly that includes optical element 12$i$ and that of the adjoining optical element 12$_{i+1}$s) are complimentary). However, allowances can also be made for residual departures in complementarity between other assembled pairings of mating optical elements to avoid cumulative retardance accumulation in the growing assembly.

Step 152: mounting the next adjoining optical element 12$_{i+2}$ as determined and repeating step 146 for orienting and mounting additional adjoining optical element(s) to complete the desired optical assembly.

With reference to FIGS. 1, 2A, 2B and 2C, according to some embodiments the method of optimizing optical retardation performance of optical elements or optical element sub-assemblies comprises the steps of:

1. Providing a lens 12 (e.g., optical elements, or optical sub-assemblies) and specifying the nominal shape of the optical element, or sub-assemblies, and element(s) index of refraction and aperture of the optical element(s), as well as incident angles and refractive angles out of the optical element(s).

2. Providing a polarimeter 10, the polarimeter comprising a light source and polarization optics comprising at least two polarizing elements or components 22A, 23, and detector 25 capable of detecting polarization changes at the wavelength of interest.

3. Mounting the lens 12 (e.g., optical element, the optical sub-assembly) to the rotary stage 10C situated between at least two polarizing elements, and aligning the lens 12 such that the optical axis OA of the lens 12 such that the optical axis is aligned (or is co-linear) to the rotation axis of the rotary stage 10C 4. Setting the polarimeter 10 so as to enable the light beam 18 provided by the light source 14 to be incident on the lens 12 at specified zones of interest and at specified incident angles.

5. Situating the detector 25 such that the light beam, after it propagates through the lens, after exiting the lens, and after propagation through the at least two polarizing elements or components 22A, 23 is collected by the detector 25

6. Rotating polarization element 23 (analyzer) situated between the lens 12 and the detector 25 about the refracted beam's axis, (minimum of 4 discrete positions is preferred, but a larger number of full 360 degree rotations is more preferable), and collecting intensity data associated with the refracted beam 18 as the polarization element 23 is rotated. The collected intensity data will change as the polarization element (e.g. analyzer 23, or ¼ wave plate) is rotated.

7. Calculating the polarization state of the refracted beam 18 passing through the lens 12 (optical element, optical sub-assembly, or lens assembly).

8. Positioning the lens 12 to a new azimuthal position via rotation of said part stage, and detecting a new incident beam on the detector 25

9. Repeating steps 6 and 7 until the lens 12 is sufficiently characterized for the zones of interest 10. Repeating steps 3-9 for other optical elements (or the optical sub-assemblies) of the entire optical system.

11. Optimizing the azimuthal position or one or more elements or lens element sub assembly to minimize the impact of the overall polarization state for the completed lens system assembly, for example by rotating one or more of the optical elements or optical sub-assemblies relative to one another.

12. Making a reference measurement through the system without a lens in place (i.e., without the lens being present in the measurement cavity) to produce reference intensity data. (This reference intensity data can be then used for removing from the retardance characteristics of the lens 12 the retardance introduced by the polarimeter 10 itself).

According to some embodiments the method includes the following steps:

1. Calculating the Stokes vector(s) for the light beam (measurement beam) characterizing the light beam, for example, with values for overall intensity, polarization values/states—e.g., horizontal polarization, vertical, linear polarization, ±45° linear polarization, and right/left hand circular polarization. This polarization state of the measurement beam 18 may be utilized as a reference for subsequent measurement/evaluation of the optical element(s) or sub-assemblies. This calculation is performed without the lens, i.e., without the optical element(s) being situated on the rotary stage 10C.

2. After the initial measurement beam characterization is completed mounting the lens under evaluation (e.g., an optical element, lens assembly, sub-assembly or lens stack) to the rotary stage 10C, and aligning the optical element(s) such that the optical axis of the lens or lens assembly is co-axial to the rotation axis of the rotary stage 10C.

3. Positioning stages 10A, 10A', 10B, and 10B' so that: (i) the light beam 18 is incident on the lens 12 at the required the aperture zone of interest for the lens, the required Angle of Incidence (AOI) at that zone, and at the required AOR;

and (ii) detector 25 is capable of detecting the light beam. Preferably the analyzer 23 and the detector 25 are situated normal to the axis of the measurement beam 18 exiting the lens 12 under evaluation (the measurement beam 18 also referred to herein as the refracted measurement beam, or the refracted beam). Situating the detector 25 so that it is normal to the axis of the measurement beam 18 advantageously maximizes the signal light intensity incident on the detector 25. That is, stages 10B and 10B' are positioned to enable collection of signal data provided by refracted measurement beams 18 (after they pass through the analyzer 23) and incident on the detector 25. In at least some embodiments the stages 10B, and 10B' are positioned such that the refracted measurement beam 18 is centered on the detector 25 and on the rotating analyzer 23, which are positioned to be substantially normal to the refracted measurement beam 18.

4. Recording detected beam intensity as a function of analyzer's rotation position for any specific azimuthal position of the lens 12 on the stage 10C and calculating the Stokes vector(s) for the light beam exiting the lens. Subtracting from these Stokes vector(s) the reference Stokes vectors calculated in step 1 to determine retardance characteristics of the lens.

5. Rotating the lens 12 to a different azimuthal position

6. Repeating steps 4 and 5 enough times to cover the aperture zone of interest

7. Repeating steps 1 through 6 for other/all elements in the assembly.

8. Upon completion of data collection for all optical elements, optimizing azimuthal position of the optical elements (e.g., by rotating the elements as necessary) to provide an overall optimized retardance for the optical system. Alternatively, upon completion of data collection for all optical elements, choosing from the optical elements the elements optical elements that are complimentary to one another and stacking them together in order to minimize overall (i.e. combined) retardance of the overall optical system.

Thus, according to some of the embodiments described herein, a method of assembling an optical system including a plurality of optical elements comprises steps of:

a) situating at least one optical element between two optical polarization elements;
b) providing a light beam incident on said at least one optical element at a specified plurality of locations, at specified incident angles, such that the light beam propagates through the at least one optical element and through the two optical polarization elements and is detected by an optical detector;
c) rotating at least one of the two optical polarization elements;
d) collecting light beam intensity data associated with the detected light beam as at least one of the two optical polarization elements is rotated;
e) determining retardance azimuthal profiles for said at least one optical element by determining the polarization state of the detected light beam that propagated through said at least one optical element and said two optical polarization elements, based on the light beam intensity data;
f) situating another optical element between the two optical polarization elements,
g) repeating steps (b through e) of providing, rotating, collecting and determining retardance azimuthal profiles for said another optical element;
h) relatively positioning said at least one optical element and said another optical element in relative orientations that enhance complementarity between the retardance azimuthal profiles of said at least one optical element and said another optical element, thus forming combinations of relatively oriented optical elements, and
i) securing the combinations of relatively oriented optical elements together as stacked optical elements to control or minimize combined retardance of the stacked optical elements forming the optical system.

According to some embodiments, the at least one optical element is not situated between the two optical polarization elements during the step of determining retardance azimuthal profiles for said another optical element. According to other embodiments, the at least one optical element and the another optical element are situated between the two optical polarization elements during the step of determining combined retardance azimuthal profile for said at least one optical element and said another optical element.

In some embodiments method of assembling a optical system including a plurality of optical elements comprises steps of:

a) situating at least one optical element between two optical polarization elements;
b) providing a light beam incident on said at least one optical element at specified plurality of locations, at specified incident angles, such that the light beam propagates through said at least one optical element and the two optical polarization elements, and is detected by an optical detector;
c) rotating at least one of the two optical polarization elements;
d) collecting beam intensity data associated with the detected light beam as at least one of the two optical polarization elements is rotated;
e) determining polarization state of the detected light beam that propagated through said at least one optical element and two optical polarization elements based on the beam intensity data;
f) situating an additional optical element adjacent to said at least one optical element and between the two optical polarization elements;
g) repeating steps of providing, rotating, collecting, and determining combined retardance azimuthal profile for a combination of the at least one optical element and the additional optical element;
h) relatively positioning the at least one optical element and the additional optical element in relative orientations that enhance complementarity between the retardance azimuthal profiles of said at least one optical element and said additional optical element, thus forming combinations of relatively oriented optical elements, and
i) securing the combinations of relatively oriented optical elements together as stacked optical elements to control or minimize combined retardance of the stacked optical elements forming the optical system.

According to the exemplary embodiments, the measured optical elements can be grouped in combinations and relative angular orientations such that optical elements having substantially complementary retardance characteristics are grouped together. I.e., the measured optical elements are positioned in relative orientations that enhance complementarity between the retardance profiles of the grouped or stacked optical elements. The optical elements can then be secured to control and/or optimize retardance performance of the stacked optical elements. According to some embodiments the enhanced complementarity between the retardance profiles of the stacked optical elements minimizes retardance of the stacked optical elements, i.e., the optical elements are chosen, oriented and/or positioned such that the overall retardance of the stacked optical elements is minimized.

Stresses or strains present in the optical elements effects their optical retardance characteristics (e.g., retardance profiles). Therefore, according to at least some of the exemplary embodiments described herein optical elements can be mounted in the optic holders prior to or during assembly, and combinations of mounted optical elements can be assembled together while minimizing accompanying stresses or strains by enhancing complementarity between the retardance profiles of the optical elements in the combinations. By reducing stresses or strains in the combinations of optical elements the desired optical performance of the stacked optical elements is optimized.

According to some embodiments, the retardance characteristics measurements of the optical elements can be used in combination with in situ measurements made during a progressive assembly (i.e., "build) of the optical elements. As each optical element or group of optical elements is secured together, retardance characteristics can be measured in situ to monitor cumulative errors in the assembly, which can also be represented by the cumulative retardance profiles. The next (adjoining) optical element, whose retardance characteristics can be premeasured, can be relatively oriented with respect to the adjacent (previously placed) optical element to reduce the cumulative error, so that the optical elements can be secured together to provide desired cumulative retardance characteristics, for example to reduce the stresses or strains that would otherwise add together to compromise the performance of the optical system.

The adjacent optical elements can be premeasured and paired with each other prior to or during assembly based on their retardance characteristics. In fact, mechanical tolerances for individual stacking elements may be relaxed so long as the measured retardance characteristics among adjacent optical elements are sufficiently complementary.

Thus, according to at least some embodiments, combinations of optical elements (where choices are available) and their relative orientations can be identified for reducing retardance or retardance variation for the assembly of the optical system. Prior to assembly, profiles of the optical elements can be measured and identified. Adjacent optical elements and/or their relative orientations can be chosen so that adjacent optical elements or groups of optical elements have substantially complementary retardance profiles, thus, for example, reducing possibilities for imparting unwanted stresses or strains.

According to some embodiments, cumulative residual low-order related errors between adjacent optical elements associated with any remaining departures in complementarity can be estimated in advance of assembly or measured during the course of assembly. Pairings of optical elements can be arranged relative to other pairings of additional optical elements so that the departure in complementarity of one pairing is complementary to the departure in complementarity of one or more other pairings to avoid an accumulation of retardance between the pairings that would otherwise change the polarization within the combinations of stacking elements.

The embodiments of the methods described herein advantageously enable characterization of lenses (e.g., optical elements, optical sub-assemblies, optical element sub-assemblies, assemblies of lens elements, etc.) for retardance performance at functional angles of incidence, with or without coatings on the surfaces of the optical elements, and while the optical elements, optical sub-assemblies or assemblies are mounted to lens holders (which can affect stress, and birefringence). The way the optical elements are mounted, their rotational orientation, and whether or not the optical surfaces have coatings can influence the retardance performance of the entire optical system. The characterization results (described by retardance at specific radial and/or azimuthal positions) of an optical element or sub assembly can be advantageously utilized to optimize performance of an assembly or the optical system by choosing optical elements with minimum retardance impact, choosing optical elements with complementary retardance characteristics, or by clocking (rotating around its axis) optical elements with non-zero retardance so as to minimize retardance impact of an assembly or the entire optical system.

The embodiments of the present invention can be practiced in a variety of other ways in accordance with the overall teaching of the disclosure for utilizing measurements of low-order surface errors in stacking elements to reduce stress or strain in optical assemblies.

It will be apparent to those skilled in the art that various modifications and variations can be made without departing from the spirit or scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

The invention claimed is:

1. A method of assembling an optical system comprising a plurality of optical elements, the method comprising steps of:

(a) measuring retardance profiles of a plurality of optical elements positioned between (a) at least two rotatable optical polarization elements and (b) a rotatable detector; and (b) relatively positioning at least some of said plurality of optical elements with respect to one another in relative orientations that enhance complementarity between the retardance profiles of the optical elements, thus forming combinations of relatively oriented optical elements, and securing the combinations of relatively oriented optical elements together as stacked optical elements to control or minimize combined retardance of the stacked optical elements forming the optical system.

2. The method of claim 1, wherein:

(i) the step of measuring retardance profiles of the plurality of optical elements comprises:

measuring retardance azimuthal profiles of the plurality of optical elements (a) with a polarimeter comprising a light source, the at least two optical polarization elements, and the detector capable of detecting polarization changes at the wavelength of interest, (b) by rotating two of said at least two optical polarization elements relative to at least one of said plurality of optical elements; and (ii) the step of relatively positioning the optical elements with respect to one another comprises: relatively positioning the optical elements in relative orientations that enhance complementarity between the retardance azimuthal profiles of the optical elements.

3. The method of assembling the optical system according to claim 2, wherein the measuring step comprises rotating at least two of said two optical polarization elements, and rotating at least one of said plurality of optical elements.

\* \* \* \* \*